(12) United States Patent
Jung et al.

(10) Patent No.: US 7,860,648 B2
(45) Date of Patent: Dec. 28, 2010

(54) MAP DISPLAY SYSTEM AND METHOD

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 0 days.

(21) Appl. No.: 12/406,478

(22) Filed: Mar. 18, 2009

(65) Prior Publication Data
US 2009/0177375 A1 Jul. 9, 2009

Related U.S. Application Data

(63) Continuation of application No. 11/124,626, filed on Apr. 30, 2005, now Pat. No. 7,522,996.

(51) Int. Cl.
G01C 21/00 (2006.01)
G06F 19/00 (2006.01)
(52) U.S. Cl. .................. 701/209; 701/211; 340/995.12
(58) Field of Classification Search ................. 701/209, 701/211; 340/995.12
See application file for complete search history.

(56) References Cited

U.S. PATENT DOCUMENTS

| 4,301,506 A | 11/1981 | Turco |
| 4,528,552 A | 7/1985 | Moriyama et al. |
| 4,528,553 A | 7/1985 | Hastings et al. |
| 4,546,439 A | 10/1985 | Gene Esparza |
| 4,570,227 A | 2/1986 | Tachi et al. |
| 4,646,089 A | 2/1987 | Takanabe et al. |
| 4,734,863 A | 3/1988 | Honey et al. |
| 4,764,873 A | 8/1988 | Libby |
| 4,796,189 A | 1/1989 | Nakayama et al. |
| 4,866,626 A | 9/1989 | Egli |
| 4,876,651 A | 10/1989 | Dawson et al. |
| 4,890,104 A | 12/1989 | Takanabe et al. |
| 4,914,605 A | 4/1990 | Loughmiller, Jr. et al. |
| 4,926,336 A | 5/1990 | Yamada |
| 4,937,753 A | 6/1990 | Yamada |
| 4,954,958 A | 9/1990 | Savage et al. |
| 4,962,458 A | 10/1990 | Verstraete |
| 4,984,168 A | 1/1991 | Neukrichner et al. |
| 5,031,104 A | 7/1991 | Ikeda et al. |
| 5,041,983 A | 8/1991 | Nakahara et al. |

(Continued)

OTHER PUBLICATIONS

U.S. Appl. No. 12/231,314, Jung et al.

(Continued)

*Primary Examiner*—Tan Q Nguyen
(74) *Attorney, Agent, or Firm*—Lee & Hayes, PLLC

(57) ABSTRACT

Provided is a computer system and methods related to a map display. A method includes but is not limited to receiving a request for the map, the map illustrating one or more locations; determining a status associated with at least one of the one or more locations on the map, the status being a function of one or more location interaction rules associated with the at least one of the one or more locations on the map; and generating a signal related to indicating on the map the status associated with the at least one of the one or more locations.

15 Claims, 11 Drawing Sheets

U.S. PATENT DOCUMENTS

| | | | |
|---|---|---|---|
| 5,067,081 | A | 11/1991 | Person |
| 5,115,399 | A | 5/1992 | Nimura et al. |
| 5,168,452 | A | 12/1992 | Yamada et al. |
| 5,170,353 | A | 12/1992 | Verstraete |
| 5,172,321 | A | 12/1992 | Ghaem et al. |
| 5,189,430 | A | 2/1993 | Yano et al. |
| 5,191,406 | A | 3/1993 | Brandestini et al. |
| 5,191,532 | A | 3/1993 | Moroto et al. |
| 5,231,584 | A | 7/1993 | Nimura et al. |
| 5,270,937 | A | 12/1993 | Link et al. |
| 5,274,387 | A | 12/1993 | Kakihara et al. |
| 5,293,163 | A | 3/1994 | Kakihara et al. |
| 5,802,526 | A | 9/1998 | Fawcett et al. |
| 5,844,570 | A | 12/1998 | Curtright et al. |
| 5,884,262 | A | 3/1999 | Wise et al. |
| 5,948,040 | A | 9/1999 | DeLorme et al. |
| 6,009,403 | A | 12/1999 | Sato |
| 6,084,882 | A | 7/2000 | Ogura et al. |
| 6,104,790 | A | 8/2000 | Narayanaswami |
| 6,119,095 | A | 9/2000 | Morita |
| 6,240,360 | B1 | 5/2001 | Phelan |
| 6,282,489 | B1 | 8/2001 | Bellesfield et al. |
| 6,321,158 | B1 | 11/2001 | DeLorme et al. |
| 6,347,299 | B1 | 2/2002 | Holzman et al. |
| 6,381,534 | B2 | 4/2002 | Takayama et al. |
| 6,493,428 | B1 | 12/2002 | Hillier |
| 6,496,842 | B1 | 12/2002 | Lyness |
| 6,604,045 | B2* | 8/2003 | Kuroda et al. ............... 701/202 |
| 7,292,935 | B2* | 11/2007 | Yoon ........................ 701/209 |
| 7,647,166 | B1* | 1/2010 | Kerns ........................ 701/207 |
| 2002/0167408 | A1* | 11/2002 | Trajkovic et al. ......... 340/573.1 |
| 2002/0174003 | A1 | 11/2002 | Redmann et al. |
| 2003/0134648 | A1 | 7/2003 | Reed et al. |
| 2004/0015293 | A1 | 1/2004 | Randazzo et al. |
| 2004/0054428 | A1* | 3/2004 | Sheha et al. ................... 700/56 |
| 2004/0172192 | A1 | 9/2004 | Knutson |
| 2004/0193707 | A1 | 9/2004 | Alam et al. |
| 2004/0217884 | A1 | 11/2004 | Samadani et al. |
| 2004/0224703 | A1 | 11/2004 | Takaki et al. |
| 2004/0254723 | A1 | 12/2004 | Tu |
| 2005/0032556 | A1 | 2/2005 | Bennett et al. |
| 2005/0072116 | A1 | 4/2005 | Bunte |
| 2005/0102099 | A1 | 5/2005 | Linn |
| 2005/0102245 | A1 | 5/2005 | Edlund et al. |
| 2005/0131643 | A1* | 6/2005 | Shaffer et al. ............... 701/210 |
| 2006/0040670 | A1 | 2/2006 | Li et al. |
| 2006/0058948 | A1 | 3/2006 | Blass et al. |
| 2006/0168592 | A1 | 7/2006 | Andrews et al. |
| 2006/0171308 | A1 | 8/2006 | Jung et al. |
| 2006/0171325 | A1 | 8/2006 | Jung et al. |
| 2006/0181546 | A1 | 8/2006 | Jung et al. |
| 2006/0198550 | A1 | 9/2006 | Jung et al. |
| 2006/0217880 | A1 | 9/2006 | Jung et al. |
| 2008/0140313 | A1 | 6/2008 | Jung et al. |
| 2008/0147312 | A1 | 6/2008 | Jung et al. |
| 2008/0215435 | A1 | 9/2008 | Jung et al. |

OTHER PUBLICATIONS

U.S. Appl. No. 12/231,325, Jung et al.
Bobrich et al., "Augented Maps", Symposium on Geospatial Theory, Processing and Applications; University of Hanover, 2002.
Espatial: iSMART Overview; located at www.espatial.com/page455. html bearing a date of Feb. 8, 2005, 3 pgs.
Gluck et al., "Augemented Seriation: Usability of a Visual and Auditory Tool for Geographic Pattern Discovery with Risk Perception Data", GeoComputation, 1999, 1 page.
Hall et al, "A Novel Interactivity Environment for Integrated Intelligent Transportation and Telematic Systems", 5th Intl. IEEE Conference, Singapore, Sep. 3, 2002.
Introduction to Augmented Reality; www.se.rit.edu/-jrv/research/ar/introction html; printed Dec. 15, 2004, 11 pages.
Lowe, J., "Raster-Oriented Technology Supports Public Internet Applications That Manage Large Raster Collections", Geospatial Solutions, Oct. 2004, 4 pages.
Seattle Area Traffic Home, web page, Dec. 10, 2004, 11:14am, www.wsdot.wa.gov/traffic/seattle.
Wei et al, "Fast Texture Synthesis Using Tree-Structured Vector Quantization", Stanford University, pp. 1-10.
Zhong, D.,"Color Space Analysis and Color Image Segmentation", School of Electrical and Information Engineering, The University of Sydney, pp. 1-5.

* cited by examiner

FIGURE 3B

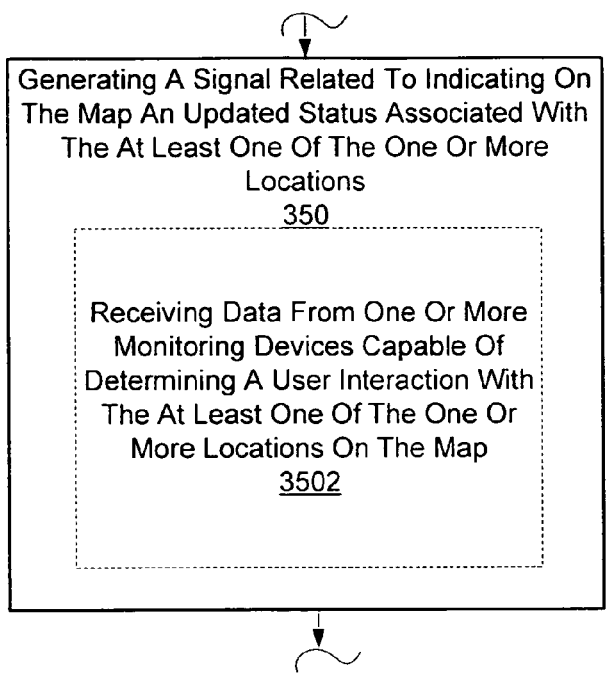

Generating A Signal Related To Indicating On The Map An Updated Status Associated With The At Least One Of The One Or More Locations
350

Receiving Data From One Or More Monitoring Devices Capable Of Determining A User Interaction With The At Least One Of The One Or More Locations On The Map
3502

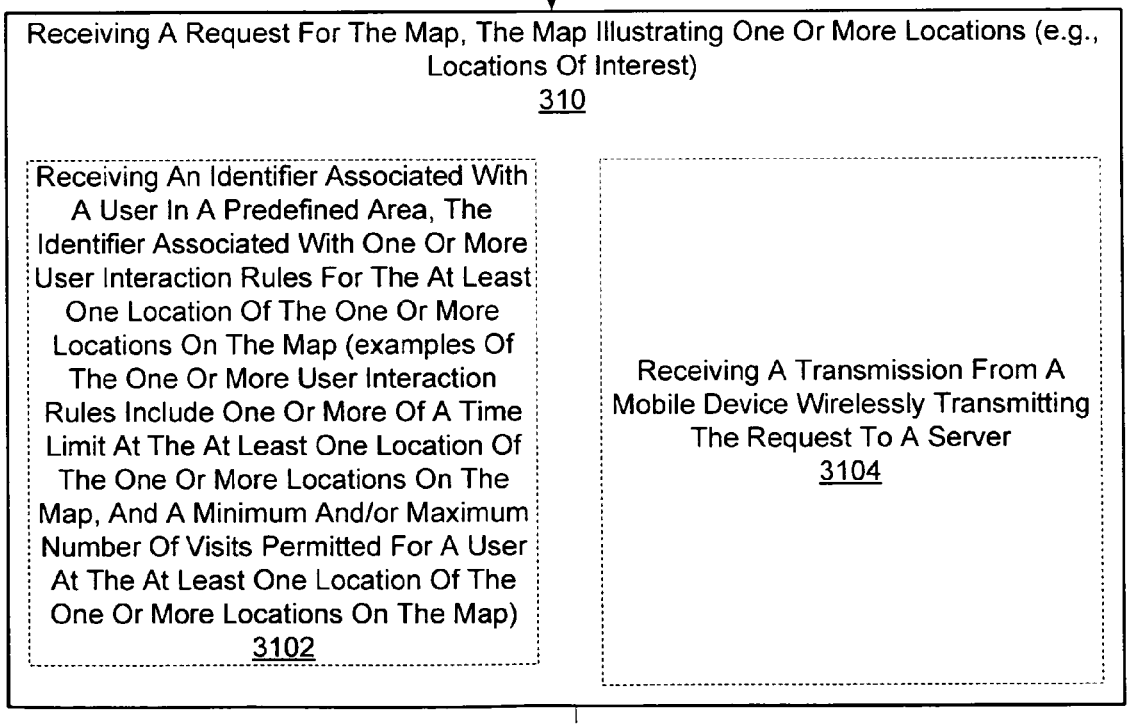

Receiving A Request For The Map, The Map Illustrating One Or More Locations (e.g., Locations Of Interest)
310

Receiving An Identifier Associated With A User In A Predefined Area, The Identifier Associated With One Or More User Interaction Rules For The At Least One Location Of The One Or More Locations On The Map (examples Of The One Or More User Interaction Rules Include One Or More Of A Time Limit At The At Least One Location Of The One Or More Locations On The Map, And A Minimum And/or Maximum Number Of Visits Permitted For A User At The At Least One Location Of The One Or More Locations On The Map)
3102

Receiving A Transmission From A Mobile Device Wirelessly Transmitting The Request To A Server
3104

Display One Or More Overlays On A Map To Represent A Traffic Condition For One Or More Locations In A Predetermined Area
410

Display An Overlay With Respect To One Or More Locations In The Predetermined Area That Indicate A Lack Of Information Pertaining To The One Or More Locations
420

Display Data Independent Of An Overlay For Those Locations About Which Additional Information Is Known
430

FIGURE 5A

Transmitting A Request For The Map Including One Or More Locations, The Request Including An Identifier Associated With A User Of A Display Device
510

↓

Receiving The Map Including One Or More Locations, At Least One Location Of The One Or More Locations Associated With One Or More Location Interaction Rules Verifiable Via One Or More Monitoring Devices
520

↓

Interacting With The One Or More Monitoring Devices To Alter The Map On The Display Device As A Function Of The Location Interaction Rules
530

MAP DISPLAY SYSTEM AND METHOD

RELATED APPLICATIONS

This application is a continuation of and claims priority from U.S. patent application Ser. No. 11/124,626, titled "Map Display System and Methods", filed on Apr. 30, 2005, and hereby incorporated by reference.

TECHNICAL FIELD

The present application relates generally to maps.

SUMMARY

In one aspect, a method related to displaying a map includes but is not limited to receiving a request for the map, the map illustrating one or more locations; determining a status associated with at least one of the one or more locations on the map, the status being a function of one or more location interaction rules associated with the at least one of the one or more locations on the map; and generating a signal related to indicating on the map the status associated with the at least one of the one or more locations on the map. In addition to the foregoing, other method aspects are described in the claims, drawings, and text forming a part of the present application.

In another aspect, a method for a display device to receive a map through a predefined area includes but is not limited to transmitting a request for the map including one or more locations, the request including an identifier associated with a user of the display device; receiving the map including one or more locations, at least one location of the one or more locations associated with one or more location interaction rules verifiable via one or more monitoring devices; and interacting with the one or more monitoring devices to alter the map on the display device as a function of the location interaction rules. In addition to the foregoing, other method aspects are described in the claims, drawings, and text forming a part of the present application.

In another aspect, a computer program product can include a signal bearing medium bearing one or more instructions including, but not limited to, one or more instructions for receiving a request for the map, the map illustrating one or more locations; one or more instructions for determining a status associated with at least one of the one or more locations on the map, the status being a function of one or more location interaction rules associated with the at least one of the one or more locations on the map; and one or more instructions for generating a signal related to indicating on the map the status associated with the at least one of the one or more locations on the map. In addition to the foregoing, other program product aspects are described in the claims, drawings, and text forming a part of the present application.

In another aspect a computer program product can include a signal bearing medium bearing one or more instructions including, but not limited to, one or more instructions for transmitting a request for the map including one or more locations, the request including an identifier associated with a user of the display device; one or more instructions for receiving the map including one or more locations, at least one location of the one or more locations associated with one or more location interaction rules verifiable via one or more monitoring devices; and one or more instructions for interacting with the one or more monitoring devices to alter the map on the display device as a function of the one or more location interaction rules. In addition to the foregoing, other program product aspects are described in the claims, drawings, and text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to a processor; a memory coupled to the processor; a receiver coupled to the processor; and a map display module coupled to the receiver and the memory. The map display module can include a data store configurable to hold data related to one or more interaction rules associated with one or more locations in a predefined area and one or more identifiers; and a status module configurable to determine a status associated with at least one of the one or more locations on the map, the status being a function of one or more location interaction rules associated with the at least one of the locations. In addition to the foregoing, other system aspects are described in the claims, drawings, and text forming a part of the present application.

In addition to the foregoing, various other method, system, and/or computer program product aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject described herein will become apparent in the text set forth herein.

BRIEF DESCRIPTION OF THE DRAWINGS

A better understanding of the subject matter of the application can be obtained when the following detailed description of the disclosed embodiments is considered in conjunction with the following drawings, in which:

FIGS. 3A-3I are flow diagrams illustrating a method in accordance with an embodiment of the subject matter of the present application.

FIG. 4 is a flow diagram illustrating a method in accordance with an embodiment of the subject matter of the present application.

FIGS. 5A-5E are flow diagrams illustrating a method in accordance with an embodiment of the subject matter of the present application.

DETAILED DESCRIPTION OF THE DRAWINGS

Those with skill in the computing arts will recognize that the disclosed embodiments have relevance to a wide variety of applications and architectures in addition to those described below. In addition, the functionality of the subject matter of the present application can be implemented in software, hardware, and/or a combination of software and hardware. The hardware portion can be implemented using specialized logic; the software portion can be stored in a memory or recording medium and executed by a suitable instruction execution system such as a microprocessor.

Figure 1:
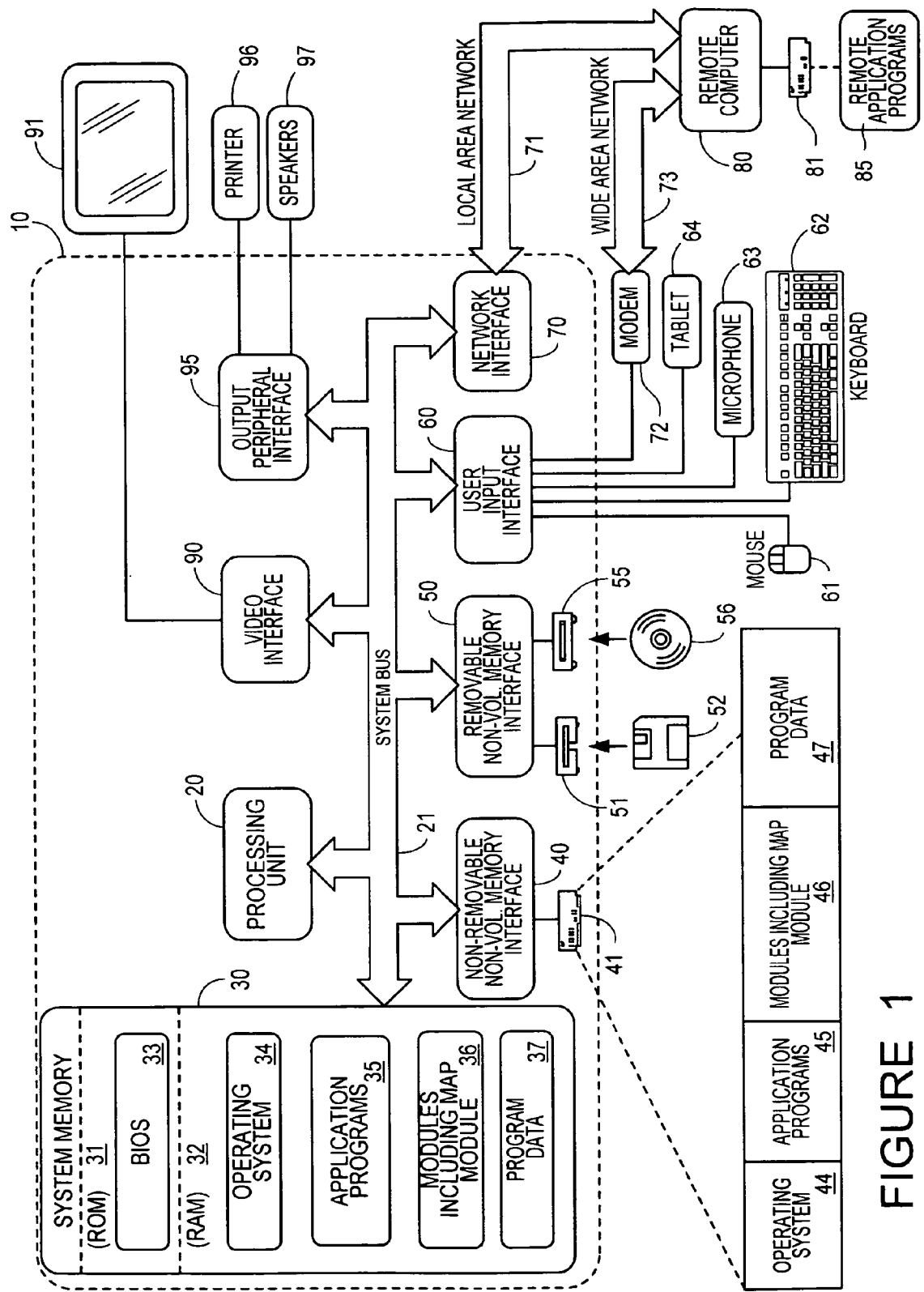
FIG. 1 is a block diagram of an exemplary computer architecture that supports the claimed subject matter.

With reference to FIG. 1, depicted is an exemplary computing system for implementing the embodiments and includes a general purpose computing device in the form of a computer 10. Components of the computer 10 may include, but are not limited to, a processing unit 20, a system memory 30, and a system bus 21 that couples various system components including the system memory 30 to the processing unit 20. The system bus 21 may be any of several types of bus structures including, but not limited to, a memory bus or memory controller, a peripheral bus, and/or a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 10 typically includes a variety of computer readable media. Computer readable media can be any available media that can be accessed by the computer 10 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 10. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 30 includes computer storage media in the form of volatile and/or nonvolatile memory such as read only memory (ROM) 31 and random access memory (RAM) 32. A basic input/output system 33 (BIOS), containing the basic routines that help to transfer information between elements within computer 10, such as during start-up, is typically stored in ROM 31. RAM 32 typically contains data and/or program modules that are immediately accessible to and/or presently being operated on by processing unit 20. By way of example, and not limitation, FIG. 1 illustrates operating system 34, application programs 35, other program modules 36, and program data 37. FIG. 1 is shown with program modules 36 including a map module in accordance with an embodiment as described herein.

The computer 10 may also include other removable/non-removable, volatile/nonvolatile computer storage media. By way of example only, FIG. 1 illustrates a hard disk drive 41 that reads from or writes to non-removable, nonvolatile magnetic media, a magnetic disk drive 51 that reads from or writes to a removable, nonvolatile magnetic disk 52, and an optical disk drive 55 that reads from or writes to a removable, nonvolatile optical disk 56 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, or the like. The hard disk drive 41 is typically connected to the system bus 21 through a non-removable memory interface such as interface 40, and magnetic disk drive 51 and optical disk drive 55 are typically connected to the system bus 21 by a removable memory interface, such as interface 50.

The drives and their associated computer storage media, discussed above and illustrated in FIG. 1, provide storage of computer readable instructions, data structures, program modules and other data for the computer 10. In FIG. 1, for example, hard disk drive 41 is illustrated as storing operating system 44, application programs 45, other program modules (such as a map module) 46, and program data 47. Program modules 46 are shown including a map module, which can be configured as either located in map modules 36 or 46, or both locations, as one with skill in the art will appreciate. Note that these components can either be the same as or different from operating system 34, application programs 35, other program modules, including map module 36, and program data 37. Operating system 44, application programs 45, map module 46, and program data 47 are given different numbers here to illustrate that they can be different copies. A user may enter commands and information into the computer 10 through input devices such as a tablet or electronic digitizer, 64, a microphone 63, a keyboard 62 and pointing device 61, commonly referred to as a mouse, trackball or touch pad. Other input devices (not shown) may include a joystick, game pad, satellite dish, scanner, or the like. These and other input devices are often connected to the processing unit 20 through a user input interface 60 that is coupled to the system bus, but may be connected by other interface and bus structures, such as a parallel port, game port or a universal serial bus (USB). A monitor 91 or other type of display device is also connected to the system bus 21 via an interface, such as a video interface 90. The monitor 91 may also be integrated with a touch-screen panel or the like. Note that the monitor and/or touch screen panel can be physically coupled to a housing in which the computing device 10 is incorporated, such as in a tablet-type personal computer. In addition, computers such as the computing device 10 may also include other peripheral output devices such as speakers 97 and printer 96, which may be connected through an output peripheral interface 95 or the like. A display device, for purposes of this patent application can include an e-paper display, a liquid crystal display or the like.

The computer 10 may operate in a networked environment using logical connections to one or more remote computers, such as a remote computer 80. The remote computer 80 may be a personal computer, a server, a router, a network PC, a peer device or other common network node, and typically includes many or all of the elements described above relative to the computer 10, although only a memory storage device 81 has been illustrated in FIG. 1. The logical connections depicted in FIG. 1 include a local area network (LAN) 71 and a wide area network (WAN) 73, but may also include other networks. Such networking environments are commonplace in offices, enterprise-wide computer networks, intranets and the Internet. For example, in the subject matter of the present application, the computer system 10 may comprise the source machine from which data is being migrated, and the remote computer 80 may comprise the destination machine. Note however that source and destination machines need not be connected by a network or any other means, but instead, data may be migrated via any media capable of being written by the source platform and read by the destination platform or platforms.

When used in a LAN or WLAN networking environment, the computer 10 is connected to the LAN through a network interface or adapter 70. When used in a WAN networking environment, the computer 10 typically includes a modem 72 or other means for establishing communications over the WAN 73, such as the Internet. The modem 72, which may be internal or external, may be connected to the system bus 21 via the user input interface 60 or other appropriate mechanism. In a networked environment, program modules depicted relative to the computer 10, or portions thereof, may be stored in the remote memory storage device. By way of example, and not limitation, FIG. 1 illustrates remote application programs 85 as residing on memory device 81. It will be appreciated that the network connections shown are exemplary and other means of establishing a communications link between the computers may be used.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data are maintained are physical locations of the memory that have particular properties defined by the format of the data. However, although the subject matter of the application is being described in the foregoing context, it is not meant to be limiting as those of skill in the art will appreciate that some of the acts and operations described hereinafter can also be implemented in hardware.

Figure 2:
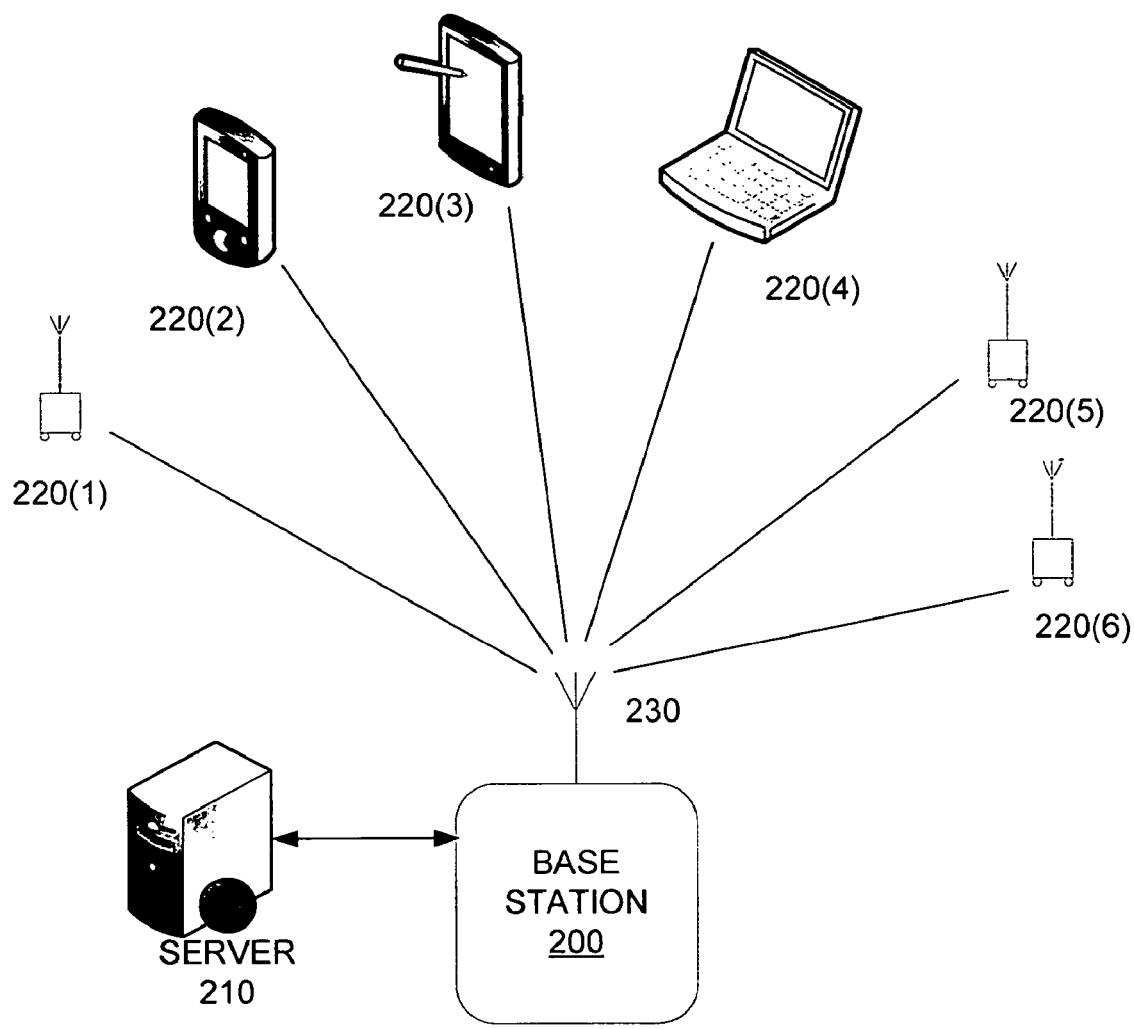
FIG. 2 is a block diagram of a wireless computer environment appropriate for embodiments of the subject matter of the present application.

Referring to FIG. 2, a diagram of a wireless network appropriate for some embodiments herein is shown. The wireless network includes a base station 200, which can be coupled to a server 210. Base station 200 interacts with a plurality of wireless components 220, which can be receivers only, designed to receive real time images and associated data as correlated and transmitted by server 210. Components interact with base station 200 via wireless connection 230. The wireless connection 230 could include a Global Positioning System (GPS), radio-frequency (RF) methods, or a wireless local area network (WLAN). Another type of wireless connection could be a tracking tag system. Tracking tags typically communicate with a base station, each tag transmitting a unique code to identify a display device to which it is attached. WLANs operate by connecting mobile devices to a base station and using signal strength sensing to determine a location of a mobile device. Other wireless connections appropriate for embodiments include satellite connections, IEEE 802.11 connections or Bluetooth-type connections or the like as one of skill in the art with the benefit of the present disclosure will appreciate.

Components 220 can include receivers and transmitters to interact with server 210. Components 220 are shown including different types of components, including components 220(1) which could be a simple device capable of only receiving and displaying data and images. The data may include one or more of written directions, a map, images, or the like. Component 220(2) is shown as a personal electronic assistant, which could be configured to both send and/or receive data, display maps and/or directions as generated by server 210. Component 220(3) is shown as a tablet personal computer (PC) which can also be configured to both send and/or receive data. Component 220(4) is shown as a laptop or notebook computer which can also send and/or receive data and/or directions. Component 220(5) could be implemented as a simple mobile device which could be configured to receive and display images that could be in real time. Component 220(6) could be implemented as a cellular telephone or pager and include a display configured to show a map and images in accordance with embodiments herein.

In an alternative embodiment, components 220 could be devices that are not coupled to a wireless network of any kind. Rather, in the embodiment, a component 220 could be configured to receive data and store data internally for later mobile use.

Figure 3A:
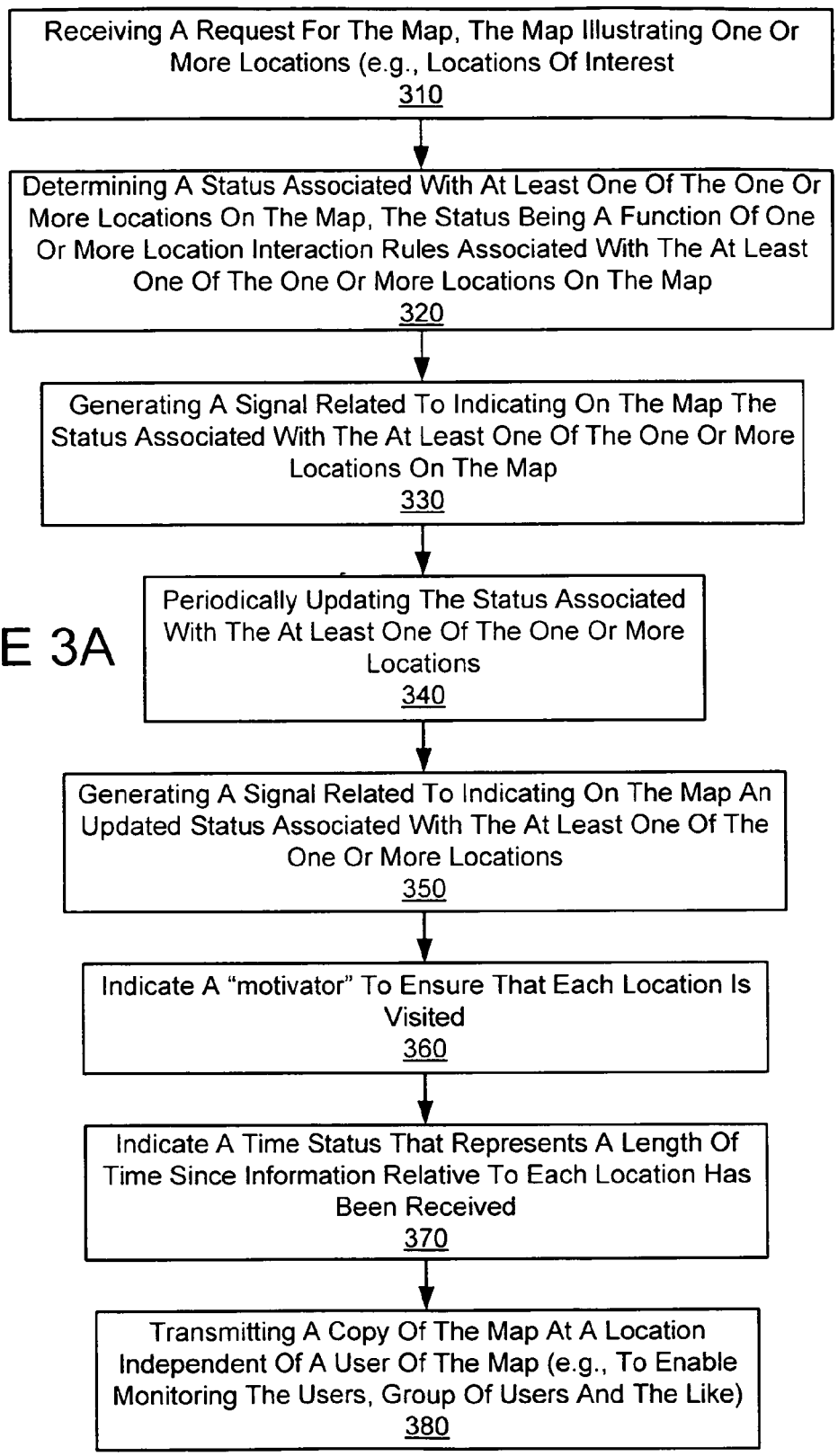

Referring now to FIG. 3A, a flow diagram illustrates a method in accordance with an embodiment. More particularly, the embodiment is directed to a method for providing a map interface and/or display that provides an indication of user location with reference to one or more interaction rules for locations on the map. Block 310 provides for receiving a request for the map, the map illustrating one or more locations (e.g., locations of interest). For example, server 210 can receive a request from one of components 220, the request for a map that illustrates locations. The request can be received wirelessly from a display device, over a network, or via a wired connection within a same system. Block 320 provides for determining a status associated with at least one of the one or more locations on the map, the status being a function of one or more location interaction rules associated with the at least one of the one or more locations on the map. For example, server 210 can determine a status by consulting location interaction rules for locations on the map. The status can be determined via receiving location information from a data source independent from the user, group or network. For example, a networked camera could provide data to the server or directly to the map device. Such a camera could determine a direction a user is heading or facing or provide data concerning locations that had been visited or are being looked at. The data sources can be configured to provide a status indication to a user relative to one or more locations including a warning that a user is facing a wrong direction relative to a location, or a highlighting on the map if a user is within a predetermined distance from the location and the like.

Block 330 provides for generating a signal related to indicating on the map the status associated with the at least one of the one or more locations on the map. For example, server 210 can generate a signal that can cause an indication on the map related to a status. The status can indicate prior presence at one or more of the plurality of locations of interest by a user, a group of individuals, such as a family, or a network of groups. The status indication can include illustrating location detail for locations that have been visited by the user, group or network. Alternatively, locations that have been visited can be obfuscated. For example, in one embodiment, the map can illustrate locations in a theme park. A ticket associated with the map can indicate one or more permissions for locations at the theme park. Once a ride or location has been visited, an embodiment is directed to provide an obfuscating of the location visited. Further, if a ticket allows a user to participate at a location a predetermined number of times, and that number has been reached, in one embodiment, the map location can disappear or standard map cross hatching can indicate that the map location has already been found/seen. Thus, in an embodiment, obfuscating a visual representation of the at least one location on the map can be a function of the status. The obfuscating can include blurring and/or unblurring an icon representing the at least one location on the map if the location has been visited by the user. Conversely, a status indication can include highlighting locations on the map, the highlighting indicative of a next location the user is to visit on the map.

Alternatively and/or in addition to the foregoing, in one embodiment, the map can provide links or metadata associated with each location. If the location has been visited, the map can be configured to inactivate a link or metadata associated with the locations. For example, the link can be associated with metadata associated with the locations that are configurable upon detection that the location has been reached or an activity at a location has been completed. The configuration can be set up to disconnect the link or metadata such that detail associated with a location is inactivated on a map display. The metadata can be associated with pop-up boxes that can be configured to appear if activated or not appear if inactivated. Alternatively, a pointer such as a mouse pointer could be configured to change its shape over an area. Thus, according to an embodiment, portions of a map can be inaccessible and/or have diminished functionality and/or indicate a change in status according to a pointer shape.

Block 340 provides for periodically updating the status associated with the at least one of the one or more locations (e.g. server 210 can periodically update the status when data is received from monitoring devices). Block 350 provides for generating a signal related to indicating on the map an updated status associated with the at least one of the one or more locations (e.g. server 210 can update the signal related to the status indicated on the map).

With reference now to FIG. 3B, a flow diagram illustrates an alternate implementation of the method of FIG. 3A. Shown is that in one alternative implementation, block 350, i.e., generating a signal related to indicating on the map an updated status associated with the at least one of the one or more locations, may include optional block 3502 which depicts receiving data from one or more monitoring devices capable of determining a user interaction with the at least one of the one or more locations on the map. For example, server 210 can receive data from monitoring devices such as cameras and the like that can determine user interactions at locations on the map.

Referring now to FIG. 3C, a flow diagram illustrates a method in accordance with an embodiment. Shown is that in one alternative implementation, block 310, i.e., receiving a request for the map, the map illustrating one or more locations, may include optional blocks 3102 and/or 3104. Optional block 3102 depicts receiving an identifier associated with a user in a predefined area, the identifier associated with one or more user interaction rules for the at least one location of the one or more locations on the map (e.g., server 210 receiving an identifier over a wireless network, the identifier associated with a user of a map). In an embodiment, interaction rules can mean rules for interacting, either rules attached to a location or rules attached to a user. Interaction rules for a user can mean rules of engagement for a location, several locations, a city, or a predetermined area for example. An identifier associated with a user that links to user interaction rules can provide appropriate user interaction rules for a particular user. For example, a user that is a deaf child can have user interaction rules that address the needs of a deaf child, allowing the user to interact in a different way than other users at different locations. Location interaction rules can include the amount of time or number of visits any user is permitted for a location. In contrast, user interaction rules can include the amount of time a user has for all locations, or provide carte blanche for a user to expand on location interaction rules. Thus, in the example, a deaf child can be associated with an identifier that identifies the user as having user interaction rules appropriate for a deaf child, with special permissions if needed. A user interaction rule can also be a function of the amount a user has paid to visit a park, a predefined area, or the like. Thus, user interaction rules can be any user specific rule that applies to a user and not to a location. Depicted is that in another alternative implementation block 310, i.e., receiving a request for the map, the map illustrating one or more locations, may include optional block 3104 which depicts receiving a transmission from a mobile device wirelessly transmitting the request to a server (e.g., server 210 receiving a transmission from a component 220).

Figures 3D, 3E:
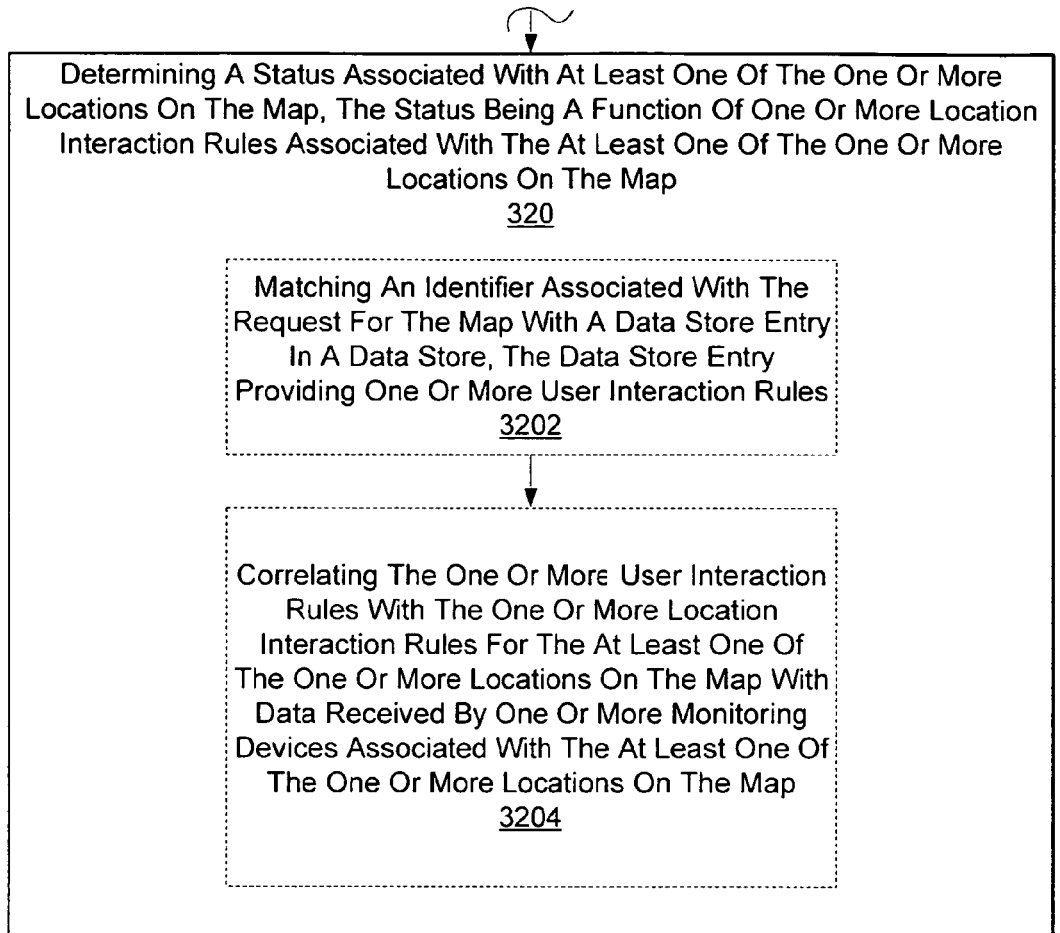

With reference now to FIG. 3D, a flow diagram illustrates a method in accordance with an embodiment. Shown is that in one alternative implementation, block 320—determining a status associated with at least one of the one or more locations on the map, the status being a function of one or more location interaction rules associated with the at least one of the one or more locations on the map—may include optional blocks 3202 and/or 3204. Block 3202 depicts matching an identifier associated with the request for the map with a data store entry in a data store, the data store entry providing one or more user interaction rules (e.g., server 210 matching an identifier in a data store in the server and locating user interaction rules where the user interaction rules can be those rules that identify a user with specific needs, such as the deaf child example provided above, or other appropriate user specific rules, such as limitations based on the type of payment a user has invested into the map). Block 3204 illustrates correlating the one or more user interaction rules with the one or more location interaction rules for the at least one of the one or more locations on the map with data received by one or more monitoring devices associated with the at least one of the one or more locations on the map. Correlating the user interaction rules with the location interaction rules can include first determining if a location interaction rule, such as the amount of time allowed at a location, has been violated. If so, a user interaction rule correlated with the location interaction rule may nullify the violation. For example, if a deaf child is associated with a user interaction rule that allows twice as much time at each location, the location interaction rule violation is nullified. The data received by a monitoring device can verify whether the location interaction rule correlated with the user interaction rule for a user has been violated. Thus, a monitoring device can detect if a user has spent more time than that allowed under either a location interaction rule or a user interaction rule.

Referring now to FIG. 3E, a flow diagram illustrates a method in accordance with an embodiment. Shown is that in one alternative implementation, block 3204, i.e., correlating the one or more user interaction rules with the one or more location interaction rules for the at least one of the one or more locations on the map with data received by one or more monitoring devices associated with the at least one of the one or more locations on the map, may include optional block 32042 which depicts determining via the data received by the one or more monitoring devices whether the user of the map has violated one or more of the one or more user interaction rules and/or location interaction rules (e.g., server 210 determining whether a user of the map has violated user interaction rules and/or location interaction rules by using data from a monitoring device). For example, location interaction rules and user interaction rules can be such that user interaction rules refine location interaction rules. Location interaction rules can include the amount of time or number of visits a user is permitted for a location. User interaction rules can include the amount of time a user has for all locations, or provide carte blanche for a user to expand on location interaction rules. A monitoring device can determine a number of times a user has been present at a location and transmit that data to server 210. Thus, for example, if location interaction rules prohibit a user from visiting a location beyond a specified number of visits, and a monitoring device determines that a user has violated that location interaction rule, a signal can be transmitted to server 210 with data that indicates that the user violated the rule. Server 210 could identify the user as having a user interaction rule giving that particular user carte blanche to all locations and modify the location interaction rules as to that user. Thus, in some instances, a user interaction rule could operate to nullify location interaction rules. Whether the location interaction rules have been violated can be transmitted to server 210 where server 210 can further determine whether action should be taken. If, for example, the user has no user interaction rules applicable to nullify the violation of the location interaction rule, the server 210 can determine that a violation occurred and transmit appropriate signals.

Figure 3F:
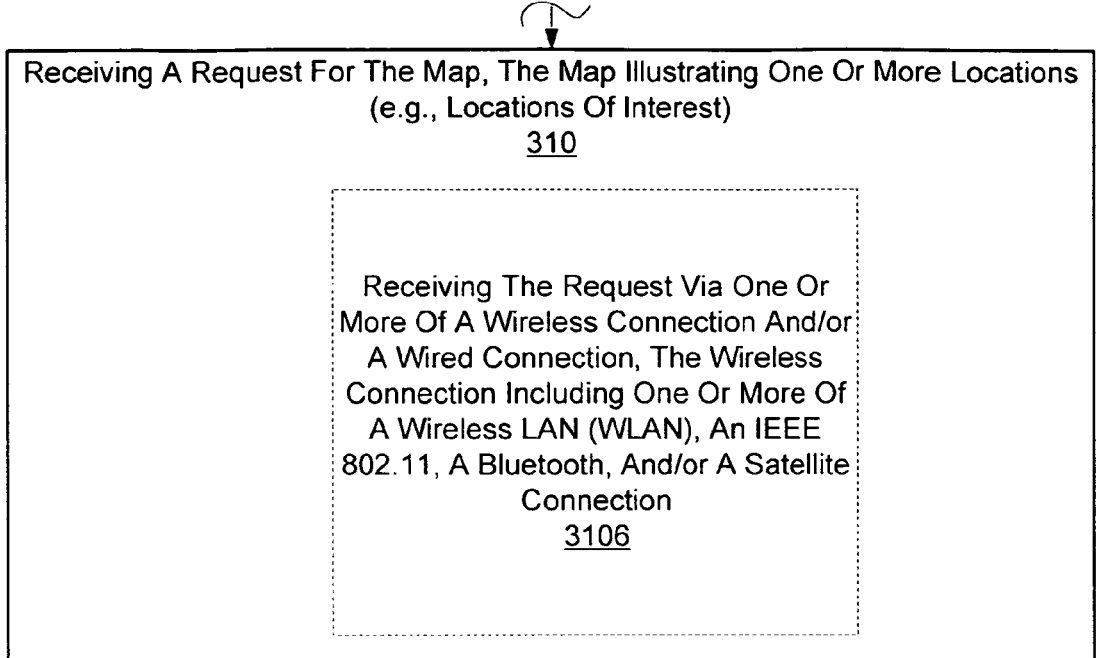

With reference now to FIG. 3F, a flow diagram illustrates a method in accordance with an embodiment. Shown is that in one alternative implementation, block 310—receiving a request for the map, the map illustrating one or more locations—may include optional block 3106 which depicts receiving the request via one or more of a wireless connection and/or a wired connection, the wireless connection including one or more of a wireless LAN (WLAN), an IEEE 802.11, a Bluetooth, and/or a satellite connection (e.g., server 210 receiving a request from one of components 220 over one or more different types of wireless or wired connections).

Figure 3G:
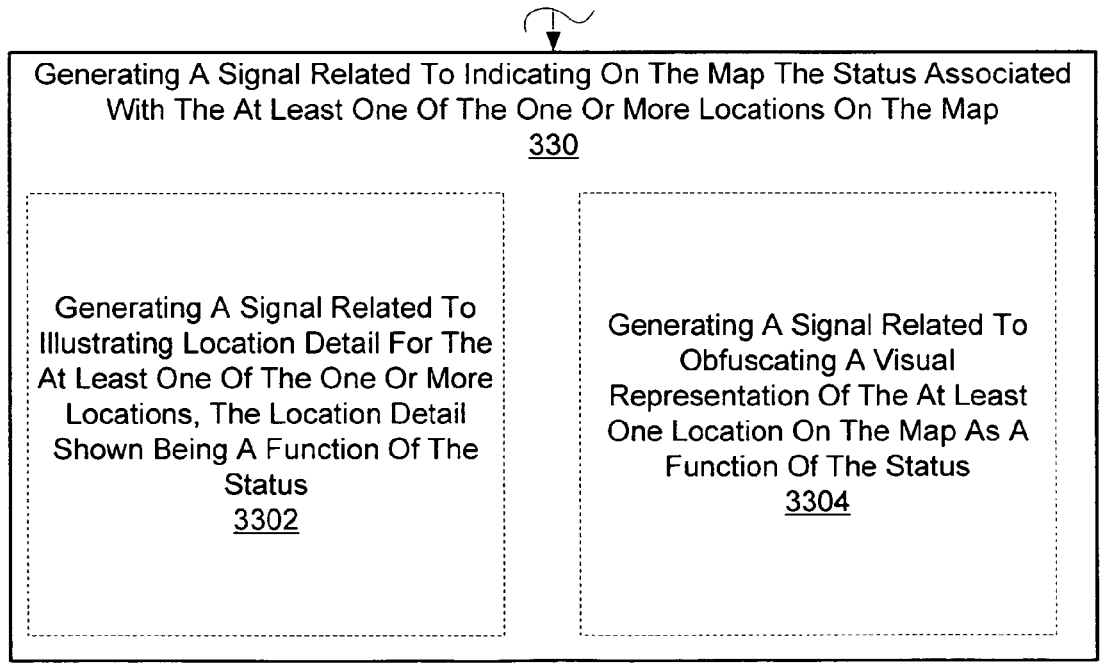

Referring now to FIG. 3G, a flow diagram illustrates a method in accordance with an embodiment. Shown is that in one alternative implementation block 330, i.e., generating a signal related to indicating on the map the status associated with the at least one of the one or more locations on the map, may include optional block 3302 which depicts generating a signal related to illustrating location detail for the at least one of the one or more locations, the location detail shown being a function of the status (e.g. server 210 generating a signal that causes a map to illustrate location detail for a location in accordance with the status of a user of the map such, for example, the amount of detail relates to the characteristics of a user of the map). Depicted is that in another alternative implementation block 330, i.e., generating a signal related to indicating on the map the status associated with the at least one of the one or more locations on the map—may include optional block 3304 which depicts generating a signal related to obfuscating a visual representation of the at least one location on the map as a function of the status (e.g., server 210 generating a signal that causes a map on one of components 220 to obfuscate a visual representation on the map of a location by blurring, making an icon fuzzy, making a visual representation disappear from the map or otherwise altering the appearance of the visual representation to make the visual representation less visually clear).

Figure 3H:
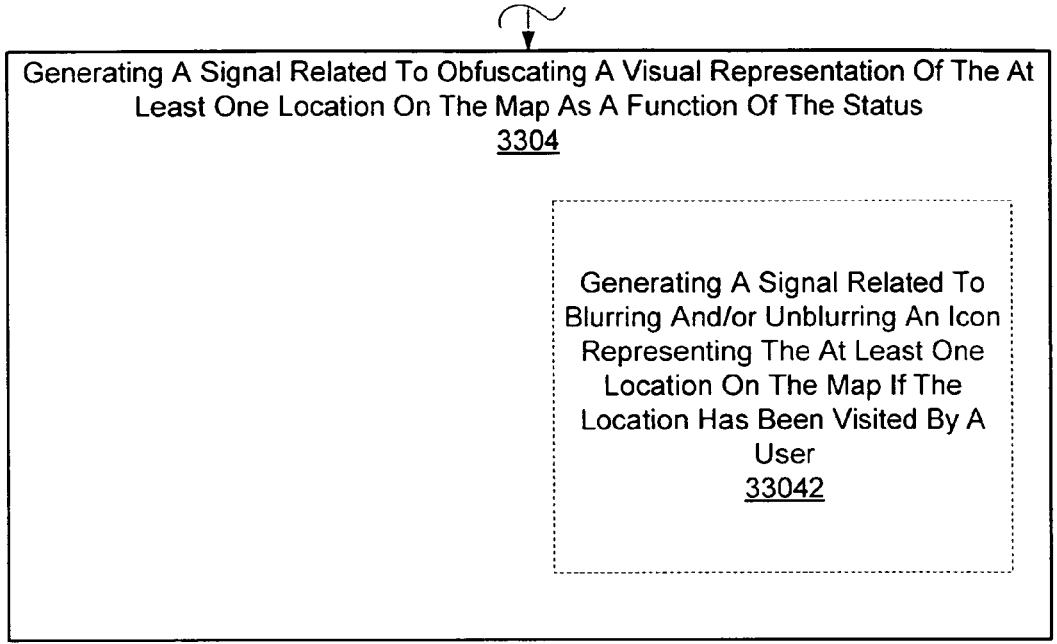

Referring now to FIG. 3H, a flow diagram illustrates a method in accordance with an embodiment. Shown is that in one alternative implementation block 3304, i.e., generating a signal related to obfuscating a visual representation of the at least one location on the map as a function of the status, may include optional block 33042 which depicts generating a signal related to blurring and/or unblurring an icon representing the at least one location on the map if the location has been visited by a user (e.g. server 210 generating a signal that causes blurring and/or unblurring of icons on the map).

Figure 3I:
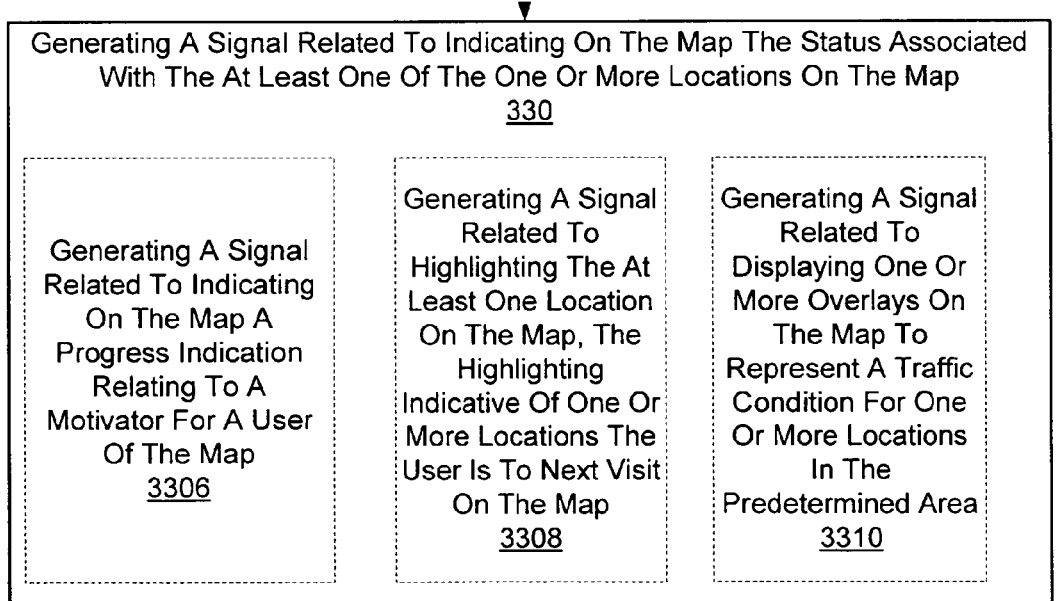

Referring now to FIG. 3I, a flow diagram illustrates a method in accordance with an embodiment. Shown is that in one alternative implementation block 330, i.e., generating a signal related to indicating on the map the status associated with the at least one of the one or more locations on the map, may include optional block 3306 which depicts generating a signal related to indicating on the map a progress indication relating to a motivator for a user of the map (e.g. server 210 generating a signal that causes on indication on the map of user progress). Depicted is that in another alternative implementation block 330, i.e., generating a signal related to indicating on the map the status associated with the at least one of the one or more locations on the map, may include optional block 3308 which depicts generating a signal related to highlighting the at least one location on the map, the highlighting indicative of one or more locations the user is to next visit on the map (e.g., server 210 generating a signal that causes highlighting a location on the map). Depicted is that in another alternative implementation block 330, i.e., generating a signal related to indicating on the map the status associated with the at least one of the one or more locations on the map, may include optional block 3310 which depicts generating a signal related to displaying one or more overlays on the map to represent a traffic condition for one or more locations in the predetermined area (e.g. server 210 generating a signal that causes a display of one or more overlays on the map related to traffic conditions).

In one embodiment, the status of the map can be associated with interaction rules related to current conditions of locations on the map, such as traffic conditions. For example, locations can be displayed with one or more overlays on the map to represent a traffic condition for one or more locations in the predetermined area. More particularly, an embodiment provides or communicating with a server and/or directly with monitoring devices or the like to receive directives related to traffic conditions such as an indication that a user is not to go to a predetermined area or directing a user to another portion of the map. The directives can be in addition to or in lieu of the diminished capabilities associated with location on the map. The instructions received from the server can include directions on where to avoid on the map because of the traffic conditions, and include other interaction rules such as locations which are unavailable, off limits, or whether the number of visits allowed has occurred.

In addition and/or in the alternative to the foregoing, in one embodiment, such as an amusement park implementation and/or in some sort of game, part of a goal relative to the park/game includes a mechanism to identify locations to ensure a user, group or network attends to each location. Thus, block 360 provides for indicating a "motivator" to ensure that each location is visited and/or to finish a course of a park/game by giving a visual incentive. One example of a visual incentive includes providing a map with icons that are blurred, and a goal of clearing the map, or vice versa. Examples of giving such incentives include giving someone in a defined group a movie pass and/or hamburger if he/she covers all the areas on the map first. In one embodiment, instead of a park or a game, the locations can be related to trade shows, or the like, wherein participants can include vendors that sponsor a map. Incentives to traverse a trade could include prizes or the like to encourage a map user to visit all booths and unblur or blur all areas of the map. Similarly, in one embodiment, the map can be provided to employees that must traverse an area for cleaning, visiting, security checks or the like to ensure compensation in accordance with user interaction rules for example.

In one embodiment, the map is configured to provide an indication if the locations in a predetermined area have changed. Block 370 provides for indicating a time status of each location that represents a length of time since information relative to each location has been received.

In one embodiment, the map is maintained in a separate location independent from a user, group of users or network of users. Block 380 provides for transmitting a copy of the map at a location independent of a user of the map (e.g., to enable monitoring the users, group of users and the like). In the embodiment, a user could have a display device with more or less capabilities than a map maintained at another location. Alternatively, a user could be without a device and interactions with the map and location of the user entirely dependent on monitoring devices and user interaction rules. Thus, for example, in an amusement park, although the map would display that a user was not permitted in a certain location, a security entity would be responsible for preventing the user from entering that certain location via the indications displayed on the map.

Referring now to FIG. 4, a flow diagram illustrates a method for a display device for areas about which inconsistent data is known concerning locations in a predetermined area. Block 410 provides for displaying one or more overlays on a map to represent a traffic condition for one or more locations in a predetermined area. Block 420 provides for displaying an overlay with respect to one or more locations in the predetermined area that indicate a lack of information pertaining to the one or more locations. For example, if a system has knowledge about the layout of a street, but does not have information as to how much traffic is on the street, an overlay or "fogging" of those areas on the street indicates that information is unknown. Block 430 provides for displaying data independent of an overlay for those locations about which additional information is known. Alternatively, as one of skill in the art will appreciate with the benefit of the present disclosure, the overlay could be reversed such that a location about which information is known is treated with an overlay. For example, a location that has camera coverage could be displayed differently on a map to highlight that camera coverage is provided.

Referring now to FIG. 5A, a flow diagram illustrates a method in accordance with an embodiment (e.g., an embodiment is directed to a display device communication to receive map data for a display device). Block 510 provides transmitting a request for the map including one or more locations, the request including an identifier associated with a user of the display device (e.g., one of components 220 transmitting a request to server 210 for a map and transmitting an identifier to server 210). The identifier can enable a mapping of the identifier with a list of locations the user/group/network is permitted to traverse or visit in the predefined area. The identifier can also be associated with an order in which the locations should be visited through the predetermined area. Block 520 provides for receiving the map including one or more locations, at least one location of the one or more locations associated with one or more location interaction rules verifiable via one or more monitoring devices (e.g., one of components 220 receiving the map from server 210). Block 530 provides for interacting with the one or more monitoring devices to alter the map on the display device as a function of the one or more location interaction rules (e.g., one of components 220 interacting with a monitoring device, which could be another of components 220). The interacting can include receiving one or more icons representing one or more locations on the map, the one or more location interaction rules determining one or more of an obfuscation of the one or more icons and/or an activation of metadata associated with the one or more locations on the map. In one embodiment, receiving the map can be via connecting with a server, the server determining whether the one or more interaction rules affect the obfuscation and/or activation of metadata for the one or more icons. The connection to the server can be via wirelessly transmitting the request to a server over a wireless network, such as a WLAN, an IEEE 802 type wireless network, a Bluetooth type wireless network, and/or a satellite network.

The map can be configurable with a user interface on the display device that receives indications that one or more locations on the map have been visited, checks to determine a limit on visits by the user, and, if the number of visits has been reached, dims or highlights the location to provide an indicator to the user.

Figure 5B:
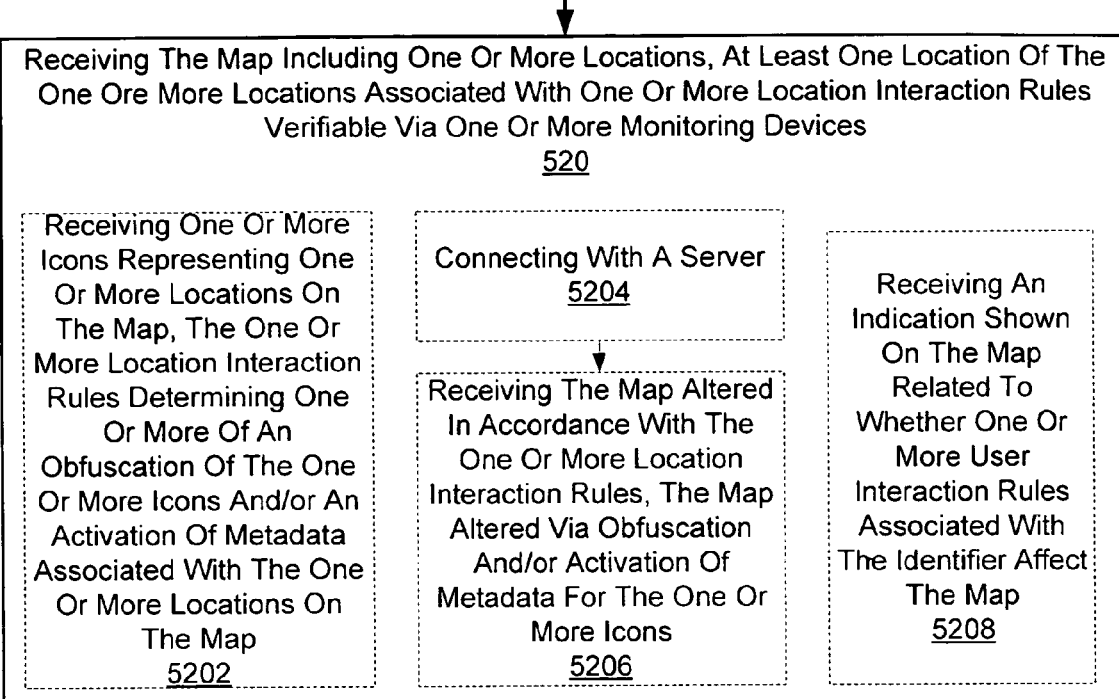

With reference now to FIG. 5B, a flow diagram illustrates an alternate implementation of the method of FIG. 5A. Shown is that in one alternative implementation, block 520, i.e., receiving the map including one or more locations, at least one location of the one or more locations associated with one or more location interaction rules verifiable via one or more monitoring devices, may include optional block 5202 which depicts receiving one or more icons representing one or more locations on the map, the one or more location interaction rules determining one or more of an obfuscation of the one or more icons and/or an activation of metadata associated with the one or more locations on the map (e.g. one of components 220 receiving icons from server 210, the icons could be pictures, images or the like representative of locations on the map, and the obfuscation can include blurring, making the icons disappear, or otherwise altering the icons so that the visual appearance of the icons is altered resulting in a less clear icon than originally present).

Figure 5C:
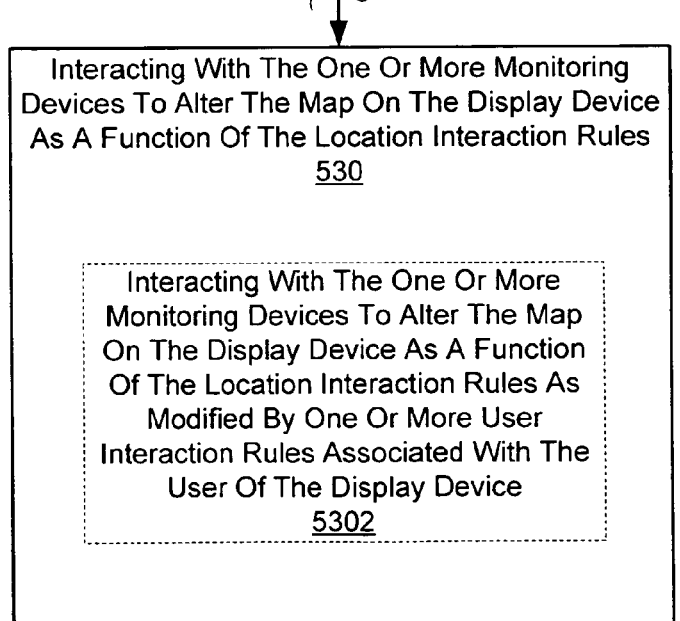

Referring now to FIG. 5C, a flow diagram illustrates an alternate implementation of the method of FIG. 5A. Shown is that in one alternative implementation, block 530, i.e., interacting with the one or more monitoring devices to alter the map on the display device as a function of the one or more location interaction rules, may include optional block 5302 which depicts interacting with the one or more monitoring devices to alter the map on the display device as a function of the location interaction rules as modified by one or more user interaction rules associated with the user of the display device (e.g., one of components 220 interacting with a monitoring device to alter the map). More particularly, in some instances the location interaction rules as modified by the user interaction rules can be incorporated into either a monitoring device or the display device so as to avoid requiring interaction with server 210. Thus, in some instances interactions between a monitoring device and the display device can result in a determination as to whether a user is following location interaction rules as modified by user interaction rules. As a result of the determination, the map can be altered. For example, if a user is allowed per location interaction rules to visit a location three times and a monitoring device detects that a user has interacted with the location two times, the display device can be altered to indicate that the user has been to the location two times and has a single return visit allowed.

With reference now again to FIG. 5B, a flow diagram illustrates an alternate implementation of the method of FIG. 5A. Shown is that in one alternative implementation, block 520, e.g., receiving the map including one or more locations, at least one location of the one or more locations associated with one or more location interaction rules verifiable via one or more monitoring devices, may include optional block 5204 and/or 5206. Block 5204 depicts connecting with a server (e.g., a component 220 connecting with server 210). Block 5206 illustrates receiving the map altered in accordance with the one or more location interaction rules, the map altered via obfuscation and/or activation of metadata for the one or more icons (e.g., component 220 receiving the map from server 210 as altered according to location interaction rules).

Figure 5D:
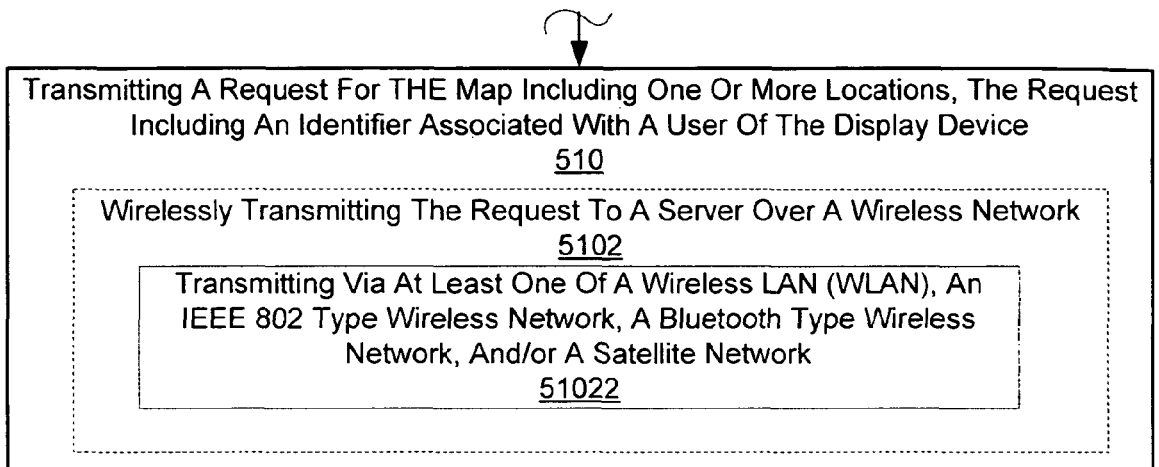
Figure 5E:
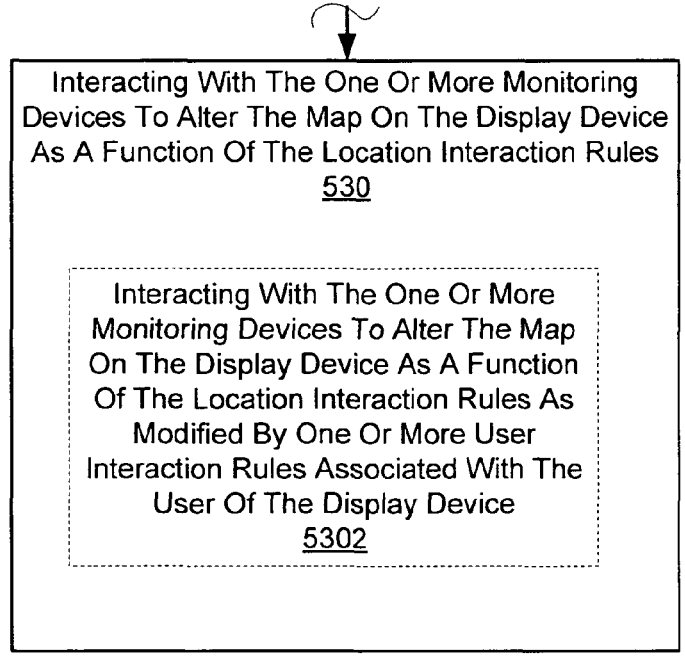

Referring now to FIG. 5D, a flow diagram illustrates one or more alternate implementations of the method of FIG. 5A. Shown is that in one alternative implementation block 510, i.e., transmitting a request for the map including one or more locations, the request including an identifier associated with a user of the display device, may include optional block 5102 which depicts wirelessly transmitting the request to a server over a wireless network (e.g. one of components 220 wirelessly transmitting the request to server 210). Depicted is that in one alternative implementation block 5102, i.e., wirelessly transmitting the request to a server over a wireless network, may include optional block 51022 which depicts transmitting via at least one of a wireless LAN (WLAN), an IEEE 802 type wireless network, a Bluetooth type wireless network, and/or a satellite network (e.g., one of components 220 transmitting via one or more different types of wireless networks).

With reference now again to FIG. 5B, a flow diagram illustrates an alternate implementation of the method of FIG. 5A. Shown is that in one alternative implementation, block 520, i.e., receiving the map including one or more locations, at least one location of the one or more locations associated with one or more location interaction rules verifiable via one or more monitoring devices, may include optional block 5208 which depicts receiving an indication shown on the map related to whether one or more user interaction rules associated with the identifier affect the map (e.g. one of components 220 receiving an indication from server 210). For example, interactions between a monitoring device and the display device can result in a determination that one or more user interaction rules associated with an identifier has been violated or affected. Such a determination could include whether a user is following location interaction rules as modified by user interaction rules. As a result of the determination, the map can be altered (e.g., affect the map). For example, if a user is allowed per location interaction rules to visit a location three times and a monitoring device detects that a user has interacted with the location two times, the display device can be altered to indicate that the user has been to the location two times and has a single return visit allowed.

Referring back to FIG. 1, in one embodiment, a computer system includes a module, shown in FIG. 1 as map modules 36 and 46. Map modules 36 and 46 can be coupled to a computer system memory and processor. For purposes of the present application, a map module coupled to the memory can include but is not limited to a map module with all module components within the memory, a map module only partially coupled to the memory and partially coupled to other components such as to firmware, and/or a map-based guide module including only some components coupled to the memory and other components in another memory, such as RAM or ROM or a storage that can be manipulated.

In an embodiment, the map module is configurable to create one or more maps for a predefined area. The map module can be included with a mobile device or can be included as part of a server, such as server 210 that creates transmissions for the mobile device to display. If a server performs the processing, an embodiment includes a transmitter configured to transmit the map to the mobile device. The map can also be transmitted to a fixed device, such as a display device.

In one embodiment, a computer system can include a processor, a memory coupled to the processor, a receiver coupled to the processor, and/or a map module coupled to the receiver and the memory. In the embodiment, the map module can include a data store configurable to hold data related to locations in a predefined area. More particularly, the data store can include identifiers associated with users, groups of users and the like, each identifier configurable to provide information related to how the users should relate to the locations according to user interaction rules, including, for example, a number of times allowed to visit a location and/or an amount of time a user can spend at a location.

The map module can further be configurable to include a status module configurable to determine a status associated with at least one of the one or more locations on the map, the status being a function of one or more location interaction rules associated with the at least one of the locations. Specifically, the status module can match an identifier associated with a received request for a map with a data store entry in the data store, the data store entry providing one or more location interaction rules for the at least one of the one or more locations on the map. The status module can further correlate the one or more location interaction rules for the locations on the map with data received by one or more monitoring devices associated with the at least one of the one or more locations on the map. In one embodiment, the status module can be configured to determine via the data received by the one or more monitoring devices whether a user, group of users or network of groups associated with a map has violated one or more of the one or more location interaction rules. The location interaction rules can include or be correlated to the user interaction rules such that user interaction rules refine location interaction rules. For example, an identifier associated with a user can provide user-specific rules for interacting with one or more locations that either modify location interaction rules by broadening interaction limitations or by limiting interaction limitations. Thus, for example, if location interaction rules normally prohibit a user from visiting a location beyond a specified number of visits, a user interaction rule could give carte blanche to all locations and modify the location interaction rules as to that user. Thus, a user interaction rule could operate to nullify location interaction rules. Conversely, a user interaction rule could operate to further limit location interaction rule limitations. For example, an identifier could be associated with a user that identifies the user as being a persona non grata as to one or more locations and all interactions could be disallowed. Thus, if a visitor to a park is discovered to have stolen an item from a prior location via a monitoring device, an identifier could be transmitted to a server that nullifies all further location interaction permissions. Further, the identifier could be associated with a security system that actively locates the user.

The map module further can include a location order determination module coupled to the data store. The location order determination module can be configurable to determine an order in which locations in the predefined area should be traversed by a user based on an identifier received by the receiver. For example, an identifier can be from a source of a request for a map. The identifier can be determinative of a number of locations and a type of locations to include in a map through the predefined area.

In one embodiment, the computer system includes a transmitter coupled to the processor. The transmitter can be configurable to transmit the map to a display device. The display device can be a mobile device, such as a cell phone, a computer device, a PDA or the like configurable to transmit a request for the map to include the route being through the predefined area.

While the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or modified steps performed in the same or a different order.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

We claim:

1. A method for a display device to receive a map through a predefined area, the method comprising:
    transmitting a request for the map including one or more locations, the request including an identifier associated with a user of the display device;
    receiving the map at the display device, the map including one or more locations, at least one location of the one or more locations associated with one or more location interaction rules verifiable via one or more monitoring devices; and
    interacting with the one or more monitoring devices to alter the map on the display device as a function of the one or more location interaction rules.

2. The method of claim 1 further comprising:
    receiving a status associated with the at least one of the one or more locations on the map.

3. The method of claim 2 wherein the receiving a status associated with the at least one of the one or more locations on the map includes:
    receiving data related to illustrating location detail for the at least one of the one or more locations, the location detail shown being a function of the status.

4. The method of claim 2 wherein the receiving a status associated with the at least one of the one or more locations on the map includes:
    periodically updating the status in accordance with the location interaction rule associated with the at least one of the one or more locations.

5. The method of claim 1 wherein the receiving the map including one or more locations, at least one location of the one or more locations associated with one or more location interaction rules verifiable via one or more monitoring devices includes:
    connecting with a server; and
    receiving the map altered in accordance with the one or more location interaction rules, the map altered via obfuscation and/or activation of metadata for the one or more icons.

6. The method of claim 1 wherein the transmitting a request for the map including one or more locations, the request including an identifier associated with a user of the display device includes:
    wirelessly transmitting the request to a server over a wireless network.

7. The method of claim 6 wherein the wirelessly transmitting the request to a server over a wireless network includes:
    transmitting via at least one of a wireless LAN (WLAN), an IEEE 802 type wireless network, a Bluetooth type wireless network, and/or a satellite network.

8. The method of claim 1 further comprising:
    receiving an indication shown on the map display related to whether one or more user interaction rules associated with the identifier.

9. A computer program product comprising:
    a computer-readable medium bearing
    one or more instructions for transmitting a request for the map including one or more locations, the request including an identifier associated with a user of the display device;
    one or more instructions for receiving the map including one or more locations, at least one location of the one or more locations associated with one or more location interaction rules verifiable via one or more monitoring devices; and
    one or more instructions for interacting with the one or more monitoring devices to alter the map on the display device as a function of the one or more location interaction rules.

10. The computer program product of claim 9 wherein the computer-readable medium comprises:
    a recordable medium.

11. The computer program product of claim 9 wherein the one or more instructions for receiving the map including one or more locations, at least one location of the one or more locations associated with one or more location interaction rules verifiable via one or more monitoring devices includes:
    one or more instructions for receiving one or more icons representing one or more locations on the map, the one or more location interaction rules determining one or more of an obfuscation of the one or more icons and/or an activation of metadata associated with the one or more locations on the map.

12. The computer program product of claim 9 wherein the one or more instructions for receiving the map including one or more locations, at least one location of the one or more locations associated with one or more location interaction rules verifiable via one or more monitoring devices includes:
    one or more instructions for connecting with a server; and
    one or more instructions for receiving the map altered in accordance with the one or more location interaction rules, the map altered via obfuscation and/or activation of metadata for the one or more icons.

13. The computer program product of claim 9 wherein the one or more instructions for transmitting a request for the map including one or more locations, the request including an identifier associated with a user of the display device includes:
    one or more instructions for wirelessly transmitting the request to a server over a wireless network.

14. The computer program product of claim 13 wherein the one or more instructions for wirelessly transmitting the request to a server over a wireless network includes:
    one or more instructions for transmitting via at least one of a wireless LAN (WLAN), an IEEE 802 type wireless network, a Bluetooth type wireless network, and/or a satellite network.

15. The computer program product of claim 9 wherein the one or more instructions for receiving the map including one or more locations, at least one location of the one or more locations associated with one or more location interaction rules verifiable via one or more monitoring devices includes:
    one or more instructions for receiving an indication shown on the map related to whether one or more user interaction rules associated with the identifier affect the map.

* * * * *